United States Patent
Bruzzone et al.

(10) Patent No.: US 7,542,194 B2
(45) Date of Patent: Jun. 2, 2009

(54) BIREFRINGENCE-COMPENSATED LIQUID CRYSTAL DISPLAY AND PROJECTION SYSTEM USING SAME

(75) Inventors: Charles L. Bruzzone, Woodbury, MN (US); David J. W. Aastuen, Shoreview, MN (US); Michael P. Keyes, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 279 days.

(21) Appl. No.: 11/297,544

(22) Filed: Dec. 8, 2005

(65) Prior Publication Data

US 2007/0133096 A1 Jun. 14, 2007

(51) Int. Cl.
*G02F 1/03* (2006.01)

(52) U.S. Cl. ........................ 359/249; 359/301; 359/513; 353/20; 349/9; 349/75

(58) Field of Classification Search ................. 359/247, 359/249, 301, 513, 514; 353/20; 349/9, 349/75

See application file for complete search history.

(56) References Cited

U.S. PATENT DOCUMENTS

| | | | |
|---|---|---|---|
| 5,327,270 A | 7/1994 | Miyatake | |
| 6,226,064 B1 | 5/2001 | Shimada et al. | |
| 6,375,328 B2 * | 4/2002 | Hashizume et al. | 353/30 |
| 6,501,523 B2 | 12/2002 | Hirota et al. | |
| 6,669,344 B2 | 12/2003 | Ishii | |
| 6,712,472 B2 | 3/2004 | Florence | |
| 6,961,181 B2 | 11/2005 | Chen et al. | |
| 7,131,737 B2 * | 11/2006 | Silverstein et al. | 353/119 |
| 2003/0002015 A1 | 1/2003 | Coates | |
| 2003/0117708 A1 * | 6/2003 | Kane | 359/513 |
| 2004/0227898 A1 | 11/2004 | Ma et al. | |

FOREIGN PATENT DOCUMENTS

| | | |
|---|---|---|
| KR | 10-1999-0055232 | 7/1999 |
| KR | 10-2002-0022370 | 3/2002 |

OTHER PUBLICATIONS

U.S. Appl. No. 10/914,596, filed Aug. 9, 2004 entitled "Projection Display System Using Multiple Light Sources and Polarizing Element for Using with Same".
U.S. Appl. No. 11/088,153, filed Mar. 25, 2005, entitled Stress Birefringence Compensation in Polarizing Beamsplitters and Systems Using Same.
Duelli, M., et al., "P-155: High Performance Contrast Enhancing Films for VAN-mode LcoS Panels," SID 05 Digest, pp. 1-4.

\* cited by examiner

*Primary Examiner*—Joseph Martinez

(57) ABSTRACT

A projection system includes an image-forming device and a polarizing beamsplitter. Illumination light illuminates the image-forming device via the first polarizing beamsplitter. A retardation element is disposed between the image-forming device and the polarizing beamsplitter. A bias controller applies a bias to pixels of the image-forming device in the dark state so as to substantially maximize contrast in image light reflected from image-forming device. In some arrangements, the volume between the polarizing beamsplitter and the image-forming device is sealed, with the retarding element being disposed within the sealed volume and being attached to either the polarizing beamsplitter or the image-forming device.

12 Claims, 4 Drawing Sheets

BIREFRINGENCE-COMPENSATED LIQUID CRYSTAL DISPLAY AND PROJECTION SYSTEM USING SAME

FIELD OF THE INVENTION

The present invention relates to image projection systems. More specifically, the invention relates to projection systems that use liquid crystal imaging panels for generating the image.

BACKGROUND

Many image projection systems, such as might be used for projection televisions, are based on the use of liquid crystal display (LCD) imager panels. Some LCD panels operate in a reflective mode, in which incident illumination light is separated from reflected image light by using a polarizing beamsplitter in front of the reflective LCD panel. In such configurations, the illumination light is passed to the LCD panel via the polarization beamsplitter. The illumination light incident at the LCD panel is, therefore, polarized. The LCD panel operates by selectively adjusting the polarization modulation of the many pixels of the panel. Those pixels associated with dark areas of the image do not alter the polarization state of the light whereas those pixels associated with bright areas of the image do alter the polarization state of the light. When the illumination light is reflected to the LCD panel by the polarization beamsplitter as reflected light, that light which has polarization that has been changed to the polarization state that is orthogonal to the polarization state of the incident light is transmitted through the polarization beamsplitter. Ideally, only the light corresponding to pixels that actively modulate the incident light is transmitted through the polarization beamsplitter to the projector's lens system, while light reflected by pixels that correspond to dark areas of the image, i.e. pixels that are not actively modulating the light, is rejected by the polarization beamsplitter. Thus, the beamsplitter can be used to separate the polarization modulated image light from the unmodulated light, which results in an image beam that can be projected.

An important characteristic of a display is the contrast ratio which, qualitatively, is a measure of how bright the bright pixels are compared to the dark pixels. The contrast ratio, $R_C$, can be quantified as:

$$R_C = I_b / I_d,$$

where $I_d$ and $I_b$ correspond to the amount of reflected light in the dark and bright states respectively. Ideally, the value of $I_d$ is as small as possible, so that the contrast ratio is large.

However, in certain types of LCD image-forming device, such as twisted nematic (TN), super twisted nematic (STN) and vertically aligned nematic (VAN) panels, the liquid crystal manifests a residual birefringence even in the off (non-modulating) state. This residual birefringence increases the amount of light in the dark state, resulting in a reduction in the image contrast ratio.

While a birefringent retardation plate with the same, but opposite retardation, may be used to compensate for this residual birefringence, a quarter-wave retardation plate, inserted between the polarizing beamsplitter and the LCD panel, can also be used to compensate for the residual birefringence. Furthermore, a quarter-wave retardation plate can also be used to compensate for birefringence in components of the polarizing beamsplitter. A compensating retardation plate is not suitable for compensating birefringence in components of the polarizing beamsplitter, and so the use of a quarter-wave retarding plate is more desirable.

The quarter wave retardation plate is oriented so that the slow or fast axis is rotated away from being parallel to the polarization plane of the illumination light by a few degrees. One disadvantage of this compensation technique, however, is the very careful alignment required to achieve the optimum orientation of the quarter wave retarder. This alignment step increases the costs of producing a projection system.

SUMMARY OF THE INVENTION

One embodiment of the invention is directed to a projection system that includes a first image-forming device and a first polarizing beamsplitter. Illumination light passes via the first polarizing beamsplitter to the first image-forming device. A first retardation element is disposed between the first image-forming device and the first polarizing beamsplitter. A bias controller is attached to the first image-forming device and applies a bias to pixels in the dark state so as to substantially maximize contrast in image light that has passed through the first polarizing beamsplitter from the first image-forming device.

Another embodiment of the invention is directed to a method of operating a projection system. The method includes illuminating an image-forming device with illumination light that has passed through a polarizing beamsplitter and through a retarding element disposed between the image-forming device and the polarizing beamsplitter. At least some of the illumination light is reflected as image light. The image light is substantially separated from non-image light using the polarizing beamsplitter. A compensating bias signal is applied to pixels of the image-forming device so as to substantially minimize dark state brightness of the image light.

Another embodiment of the invention is directed to a projection device. The device includes a first sealed unit that has a first polarizing beamsplitter separated from a first image-forming device. A first seal connects between the polarizing beamsplitter and the image-forming device to enclose a sealed volume enclosed by the seal, the first polarizing beamsplitter and the first image-forming device. A retarding element is disposed within the sealed volume and is attached to one of the first polarizing beamsplitter and the first image-forming device.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
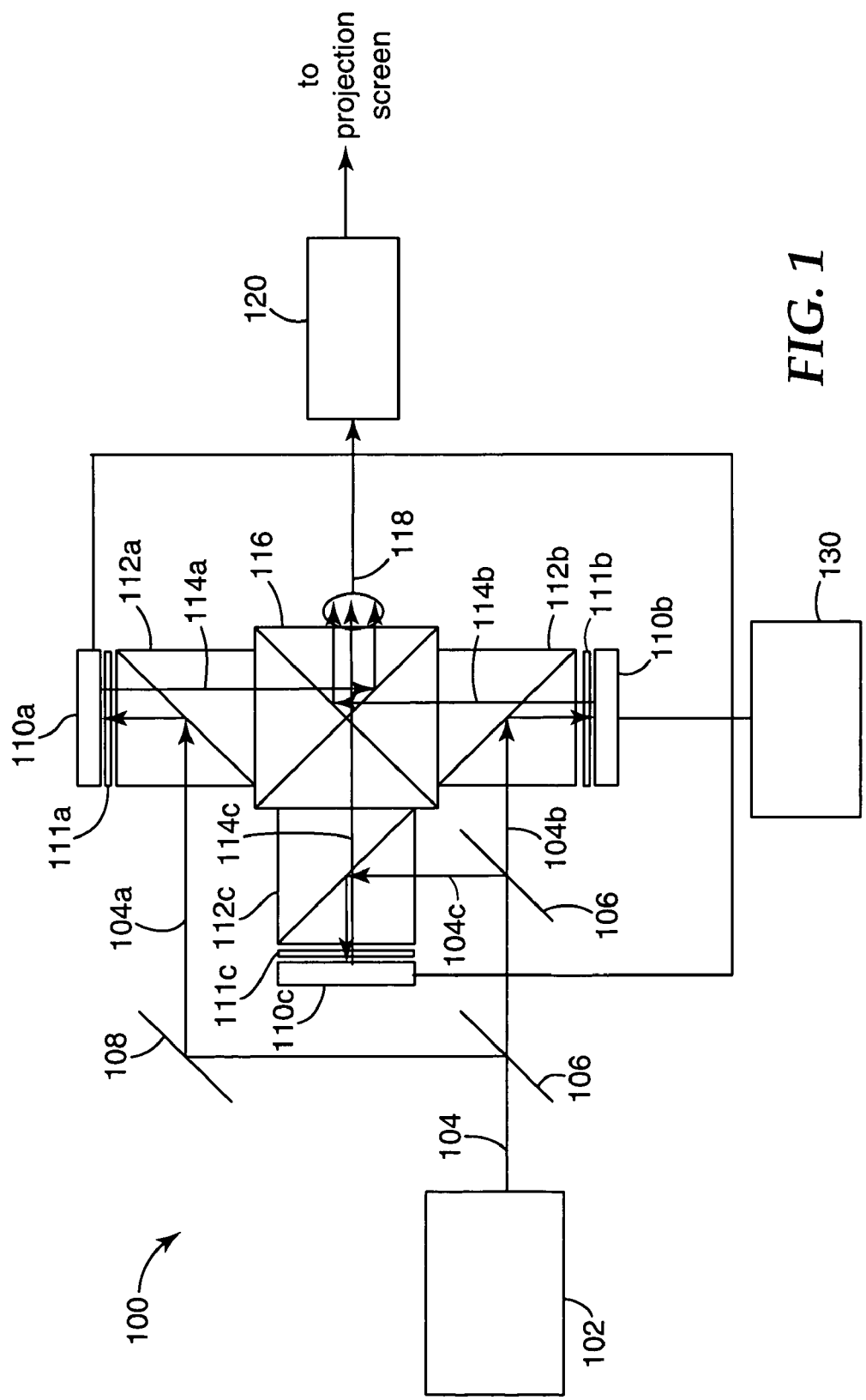
FIG. 1 schematically illustrates an embodiment of a projection system that compensates for residual birefringence in the image-forming devices according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention may be used in many different types of projection system. One exemplary embodiment of a multi-panel projection system 100 that may incorporate the invention described below is schematically illustrated in FIG. 1. The projection system 100 is a three-panel projection system, having a light source 102 that generates a light beam 104, containing light in three different color bands. The light beam 104 is split by color splitting elements 106 for example, dichroic mirrors, into first, second and third beams 104a, 104b and 104c containing light of different colors. The beams 104a, 104b and 104c may be, for example, red, green and blue in color respectively. Beam steering elements 108, for example mirrors or prisms, may be used to steer any of the beams 104, 104a, 104b and 104c.

The beams 104a, 104b and 104c are directed to respective image forming devices 110a, 110b and 110c which may be, for example, LCD-based reflective image-forming panels, such as liquid crystal on silicon (LCoS) panels. The light beams 104a, 104b and 104c are coupled to and from the respective image-forming devices 110a, 110b and 110c via respective polarizing beamsplitters (PBSs) 112a, 112b and 112c. The image-forming devices 110a, 110b and 110c polarization modulate the incident light beams 104a, 104b and 104c so that the respective image beams 114a, 114b and 114c are separated by the PBSs 112a, 112b and 112c and pass to the color combiner unit 116. In the illustrated exemplary embodiment, the illumination light beams 104a, 104b and 104c are reflected by the PBSs 112a, 112b and 112c to the image-orming devices 110a, 110b and 110c and the resulting image light beams 114a, 114b and 114c are transmitted through the PBSs 112a, 112b and 112c. In another approach, not illustrated, the illumination light may be transmitted through the PBSs to the image-forming devices, while the image light is reflected by the PBSs.

Retardation elements 111a, 111b, 111c, for example quarter-wave retardation elements, are positioned between the image-forming devices 110a, 110b, 110c, and their respective PBSs 112a, 112b, 112c. The retardation elements 111a, 111b, 111c may be used for compensating for residual birefringence in the image forming devices 110a, 110b, 110c and, as is explained in greater detail below, for compensating birefringence in the PBSs 112a, 112b, 112c. If the PBSs 112a, 112b, 112c are of the MacNeille type, then the retardation elements 111a, 111b, 111c may be used for compensating for skew ray effects as well as residual birefringence in the image forming devices.

In the illustrated exemplary embodiment, the color combiner unit 116 combines image light beams 114a, 114b and 114c of different colors, for example using one or more dichroic elements. In particular, the illustrated exemplary embodiment shows an x-cube color combiner, but other types of combiner may be used. The three image beams 114a, 114b and 114c are combined in the color combiner unit 116 to produce a single, colored image beam 118 that may be directed by a projection lens system 120 to a screen (not shown).

A controller 130 is connected to the three image forming devices 110a, 110b, 110c. The controller 130 applies control signals to the image forming devices 110a, 110b, 110c that controls the image formed by each image forming device. Also, for reasons that are described further below, the controller 130 applies respective bias signals to each of the image forming devices 110a, 110b, 110c for maximizing the contrast in the respective image light beams 114a, 114b, 114c. The controller may be coupled to a video source, such as a computer or television tuner, to receive a video signal. The video signal is processed to produce the control signals that are directed to each of the image forming devices 110a, 110b, 110c.

Other embodiments of projection systems may use one or more PBSs. For example, a projection system may use one or two image-forming devices, with respective PBSs, as is described in greater detail in U.S. patent application Ser. Nos. 10/439,449 and 10/914,596, incorporated herein by reference. The maximum number of image-forming devices is not limited to three, and projection systems may use more or fewer than three image-forming devices. In addition, different types of light sources may be used, including white light sources, such as high-pressure mercury lamps, and colored light sources, such as light emitting diodes. The intention with the illustrated embodiment is not to limit how the illumination light reaching the image forming devices is generated, nor to limit how the light is processed before reaching the image forming devices.

Some types of liquid crystal image-forming devices, such as the vertically aligned nematic (VAN) mode LCD devices, have of the order of 5 nm of residual retardation in the dark state. This can be compensated with a retarder that provides at most 5 nm retardation, oriented at 90° to the orientation of the residual retardation of the image-forming device. There are advantages, however, to using a quarter-wave retarder for compensating the residual birefringence. For example, a quarter-wave retarder is effective at compensating for stress birefringence in the glass prism of a polarizing beamsplitter, e.g. see U.S. patent application Ser. No. 11/088,153, incorporated by reference, and, in the case of the PBS being a MacNeille PBS, for compensating for skew ray birefringence.

Figure 2A:
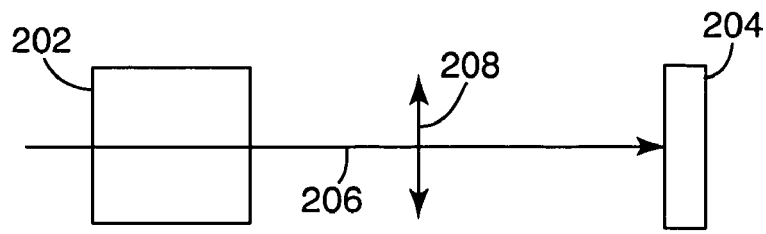
FIGS. 2A and 2B schematically illustrate the effects of residual birefringence in an image-forming device.
Figure 2B:
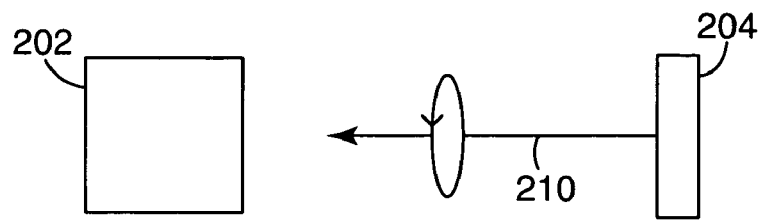

The use of an applied bias to control the residual birefringence of the image-forming device is now described with reference to FIGS. 2-4. An arbitrary co-ordinate system has been used in these figures to simplify the following explanation. The x-z plane lies parallel to the plane of the figure while the y-direction lies in a direction into the figure. FIGS. 2A and 2B illustrate a situation without a retardation element between the polarizing beamsplitter 202 and the image-forming device 204. In FIG. 2A, light 206 propagating in the z-direction from the polarizing beamsplitter 202 is assumed to linearly polarized, i.e. x-polarized, as illustrated by the double-headed arrow perpendicular to the propagation direction of the light 206. In FIG. 2B, the light has been reflected by the image-forming device 204 and is now propagating in the backwards direction, the negative z-direction. Since there is some residual birefringence in the image-forming device, the light 210 is no longer linearly polarized, but contains a combination of polarized components, i.e. the light contains a combination of x-polarized and y-polarized components. In the figure, the light is shown as being elliptically polarized, with the y-polarized component being detrimental to the contrast ratio of the projection system. It will be appreciated that in practical systems, it is difficult to obtain completely linearly polarized light propagating out of the polarizing beamsplitter. This description, however, is directed to that light that is polarized parallel to the x-direction.

Figure 3A:
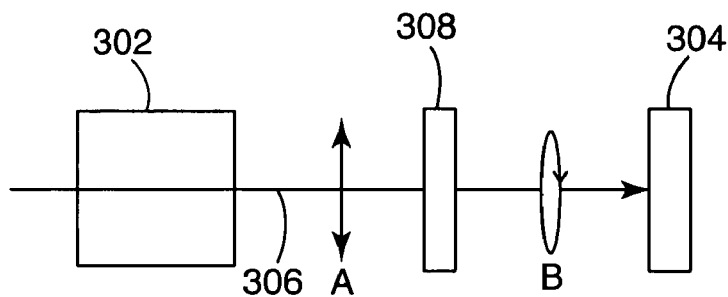
FIGS. 3A-3C schematically illustrate the effects of residual birefringence with a compensating retarding element.
Figure 3B:
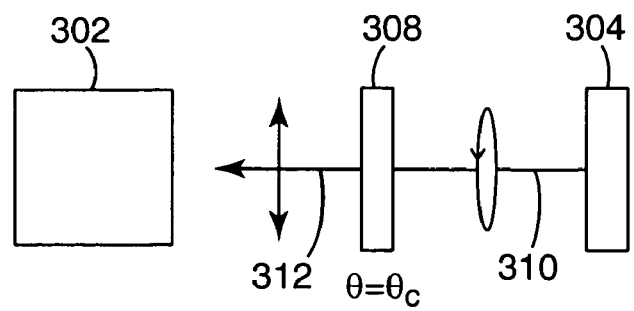
Figure 3C:
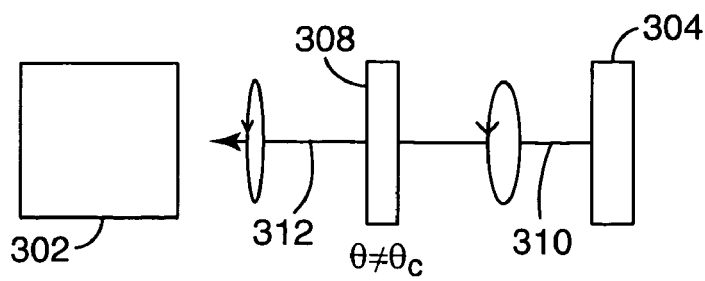

In FIG. 3A, the light 306 propagates from the polarizing beamsplitter 302, through the retarding element 308, to the image-forming device 304. At position A the light 306 is linearly polarized and then passes through the retarder element 308 to become elliptically polarized, at position B. The light 306 is shown having clockwise elliptical polarization. After experiencing the residual birefringence of the image-forming device 304, the reflected light 310, shown in FIG. 3B, is also elliptically polarized, but is now elliptically polarized in the counter-clockwise direction. If the retarding element 308 provides exactly enough retardation to compensate for the residual retardation in the image-forming device 304, then the light 312 that has passed through the retarding element 308 is linearly polarized before reaching the polarizing beamsplitter 302. The orientation condition for exact compensation of the residual birefringence is that the retarding element is oriented to an angle, θ, that is equal to $\theta_C$, the angle that provides exact compensation. In this situation, the value of θ is critical to achieving high contrast: orienting the retarding element to an angle other than $\theta_C$ can result in a significant drop in contrast. For example, in some LCD projection systems, the contrast can drop by 30% or more when the value of θ is about ±0.5° from the value of $\theta_C$. For example, tests for this effect in a commercially available JVC G1000 projector, supplied by JVC Corp., Yokohama, Japan, have shown that contrast falls by 30% when the compensator is rotated by 0.5° from its preset optimum rotation angle. In a projector system that uses a Brillian type 720p VAN mode image-forming device, supplied by Brillian Corp., Tempe Ariz., the contrast falls by 40% when the compensator is rotated from the optimum setting by 0.7°.

According to an embodiment of the present invention, another approach to compensating for the residual birefringence of the image-forming device is to bias the birefringence of the image-forming device, while also using a retarding element. This alters the overall birefringence of the image-forming device and the bias can easily be adjusted to a value that maximizes the contrast: electrically adjusting the bias is significantly less time consuming than manually adjusting the retarding element, and is easier to maintain at a constant value over time. Thus, the processes of assembling the projection device and maintaining high performance are simplified and the device become more manufacturable.

Figure 4A:
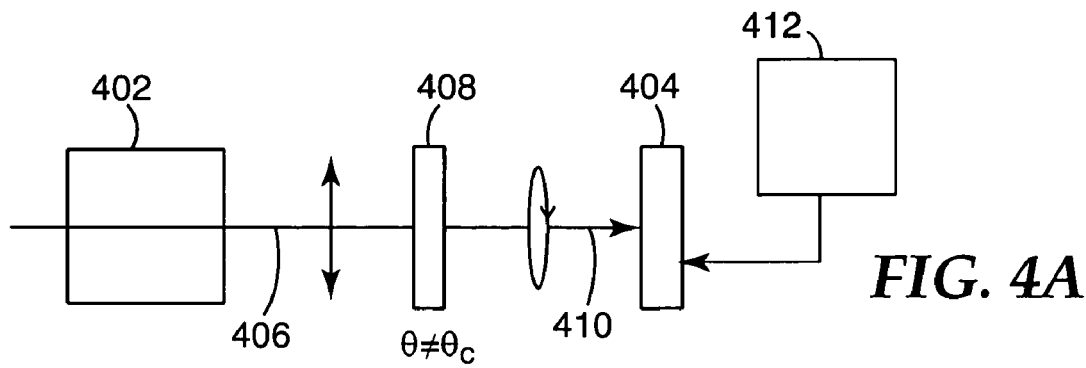
FIGS. 4A and 4B schematically illustrate the effects of residual birefringence with a compensating retarding element and a bias applied to the image-forming device, according to principles of the present invention.
Figure 4B:
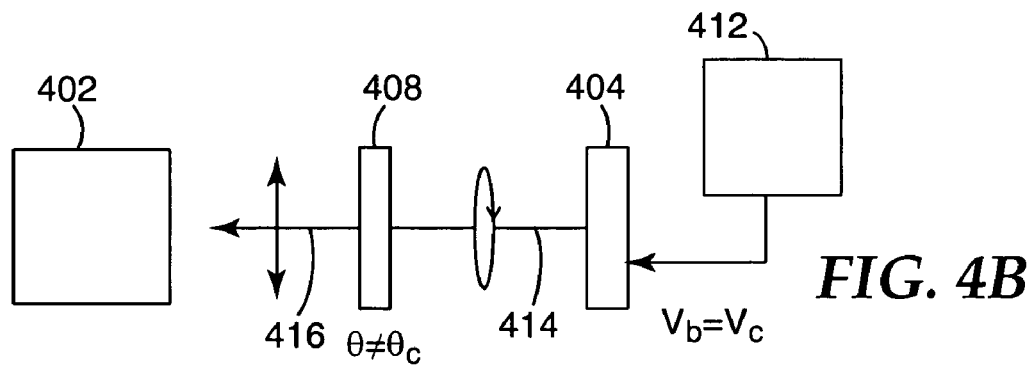

An exemplary arrangement for carrying out the invention is schematically illustrated in FIGS. 4A and 4B. In FIG. 4A, light 406 propagates towards the image-forming device 404 from the polarizing beamsplitter 402. The light 406 is assumed to be substantially linearly polarized on exiting from the polarizing beamsplitter 402. The light 406 passes through the retarding element 408 and becomes elliptically polarized light 410. The retarding element 408 is oriented to an angle θ that is not equal to $\theta_C$. A bias controller 412 applies a bias to the image-forming device 404. The light 414 reflected from the image-forming device 404 has a polarization state that can be adjusted by adjusting the bias to the image-forming device. The polarization state is adjusted so that the reflected light 416 passing out of the retarding element 408 to the polarizing beamsplitter 402 has a substantially maximized contrast ratio, which corresponds to the light 416 having a polarization state that is substantially linear. This condition occurs when the bias voltage, $V_b$, applied by the controller 412 is substantially equal to $V_c$, the value required for maximum contrast.

Another way of understanding this compensation technique is to consider that the light experiences three independent sources of birefringence during the round trip between the polarizing beamsplitter and the image-forming device, namely the birefringence from the retarding element, $b_e$, the residual birefringence, $b_r$, and the bias birefringence, $b_b$. The residual birefringence, $b_r$, and the bias birefringence, $b_b$, both increase the retardance seen by the incident polarized light ray. Maximum contrast occurs when the orientation of $b_e$ is such that overall retardation is minimized.

Since there is always some stray birefringence in the image-forming device, 404, another way of understanding this compensation technique is to consider that a compensator 408 may be oriented with its optic axis at a non-zero angle, $\theta_C$, to the input polarization such that the amount of retardation the polarized light ray will experience in its round trip through the compensator 408 and image forming device 404 is minimized. When the compensator 408 is rotated to an angle $\theta > \theta_C$, the light ray 416 becomes overcompensated and the light ray 416 traveling back to the PBS 402 contains a larger y-polarization component than is desired. However, the bias applied by the image-forming device 404, through application of the bias voltage $V_c$, can largely compensate for this added retardation. In this way the projection system may be adjusted to best contrast through an electronic adjustment rather than a mechanical one.

Using the present compensating technique, the core of a projection system can be aligned using the following steps:
i) The quarter-wave retarder is attached to either the image-forming device or the polarizing beamsplitter. It may be desired to attach the quarter-wave retarder using a substantially index matching optical adhesive. This reduces the number of reflecting surfaces, which results in lower losses and reduced image ghosting.
ii) The image-forming devices and polarizing beamsplitters are arranged around the color combiner.
iii) The six axes of each image-forming device (three positions, x, y, z, three angles, pitch, roll and yaw) are adjusted so that each is in focus, oriented properly in the horizontal and vertical directions and centered in the optical system and with the other image-forming devices
iv) The dark state bias voltage, $V_b$, of each image-forming device is adjusted for the lowest light output from the color channel controlled by that image-forming device.

Figure 5A:
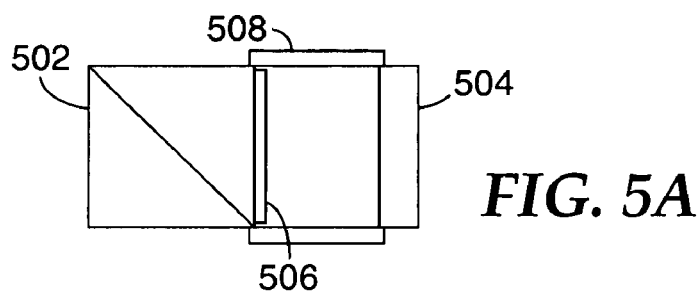
FIGS. 5A and 5B schematically illustrate embodiments of sealed imaging units according to principles of the present invention.
Figure 5B:
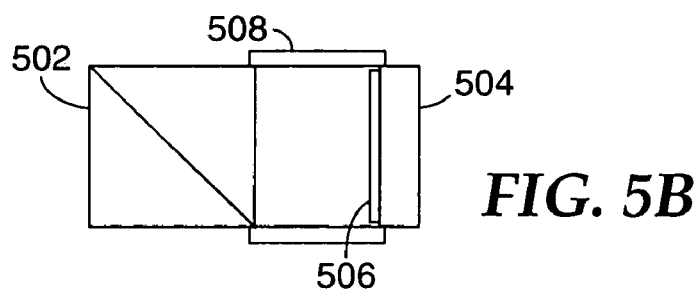

In addition to reducing the complexity of the manufacturing process and reducing the number of reflecting surfaces, this technique also permits a configuration that reduces the amount of dust or other unwanted particles settling on optical surfaces, particularly the image-forming device. Dust on the image-forming device can strongly affect both the dark and bright states of the image-forming device. In the bright state, the dust shows up as a more-or-less focused spot of the complementary color to the color channel of the image-forming device. For example, for an image-forming device in the green channel of a three-channel projection system, the dust particle produces a magenta spot. In the dark state, the dust appears as a spot of the same color as the color channel. For example, for an image-forming device in the green channel of a three-channel projection system, the dust particle produces a green spot. It has been found to be complicated and often expensive to develop attachment methods for the image-forming devices and compensators that produce a dust-tight seal enclosing the faces of the polarizing beamsplitter, the image-forming device and both sides of a free-standing compensating retarder. By attaching the compensating retarder to either the image-forming device to the polarizing beamsplitter, the problem is significantly simplified: there is now only one gap to seal, rather than two, and the reduced number of attachment points facilitates simple sealing structures. These two possibilities are schematically illustrated in FIGS. 5A and 5B. In each case, a seal 508 is formed between the polarizing beamsplitter 502 and the image-forming device 504 for excluding dust from the optical surfaces. In FIG. 5A the retarding element 506 is attached to the polarizing beamsplitter 502 and in FIG. 5B the retarding element 506 is attached to the image-forming device 504. The compensating technique described above in which a bias is applied to the image-forming device 504 permits the attachment of the retarding element 506 to either the beamsplitter 502 or the image-forming device 504 to be made simply, without high precision orientation of the retarding element 506 being needed to achieve an orientation angle of exactly $\theta_c$.

It will, of course, be appreciated, that the retarding element 506 need not be attached to either the polarizing beamsplitter 502 or the image-forming device 504, but may be positioned between the polarizing beamsplitter 502 or the image-forming device 504 and supported using some other support structure.

EXAMPLE

The technique was tested on a type 720p VAN mode liquid crystal on silicon (LCoS) image-forming device, supplied by Brillian Corp, Tempe, Ariz. A quarter-wave retarder on a precision rotation stage was positioned between a polarizing beamsplitter and the image-forming device. The system was illuminated with green light from an arc lamp at f/2.3. The illumination light was reflected by the polarizing beamsplitter to the image-forming device. A projection lens was mounted to project the light reflected by the image-forming device that was transmitted by the polarizing beamsplitter. A light meter was placed 10 cm in front of the projection lens to measure the projected light flux. The angle of rotation of the quarter-wave retarder required to compensate this imager optimally is around 0.25°, corresponding to a residual birefringence of approximately 0.75 nm.

The retarder was aligned so that an optimally dim dark state was achieved with the image-forming device set to a greyscale of zero (GS=0), at which point the light level was measured as 7.5 lux. The angle for this condition is designated as θ=0°. When the retarder was rotated through an angle of 0.125°, the dark state brightness increased to 8 lux, corresponding to a contrast degradation of around 6.5%.

Next, the voltage level applied to the image-forming device was adjusted to obtain the lowest possible brightness when the retarder was oriented at θ=0.125°. The bias voltage is measured in terms of the greyscale level for a Gamma of 2.0, for the image-forming device with the quarter-wave retarder as originally oriented at θ=0°. This set of grey scales numbered 256, corresponding to 8-bit color. This was done for actual convenience. In a practical system, the bias voltage may be introduced as equal to the voltage level corresponding to the grey scales referenced. For this rotation of the retarder, at 0.125°, the dimmest dark state was measured at the 20th grey scale, at a level of 7.7 lux. This is not quite as dark as the dark value achieved at θ=0°, but is 60% better than without the bias voltage, and results in a reduction in the contrast from the optimal value by only 2.5%.

Practical considerations of angular tolerance determine the size of the offset. For example, if the polarizing beamsplitter orientation is controlled to within ±0.1° and the axis of the retarder is controlled to within ±0.05°, then it becomes desirable to place the retarder in the system at a minimum offset angle of 0.3°.

In order to test other angular placements, the effects of offsetting the retarder by 0.375° were explored. In this case, the GS=0 dark state (zero bias) condition resulted in a measured light output of 11.5 lux, reducing the contrast by 50% from that obtained with θ=0°. Adjusting the bias resulted in a minimum dark state light intensity of 8.3 lux, obtained at a grey scale level of about 47. Thus, 80% of the reduction in contrast was recovered, and the achieved contrast was only about 10% lower than with θ=0°. Since the overall contrast level of such image-forming devices has been measured to exceed 3000:1, a 10% reduction still results in a contrast ratio of 2700:1, which is still acceptable for many commercial projection systems.

Figure 6:
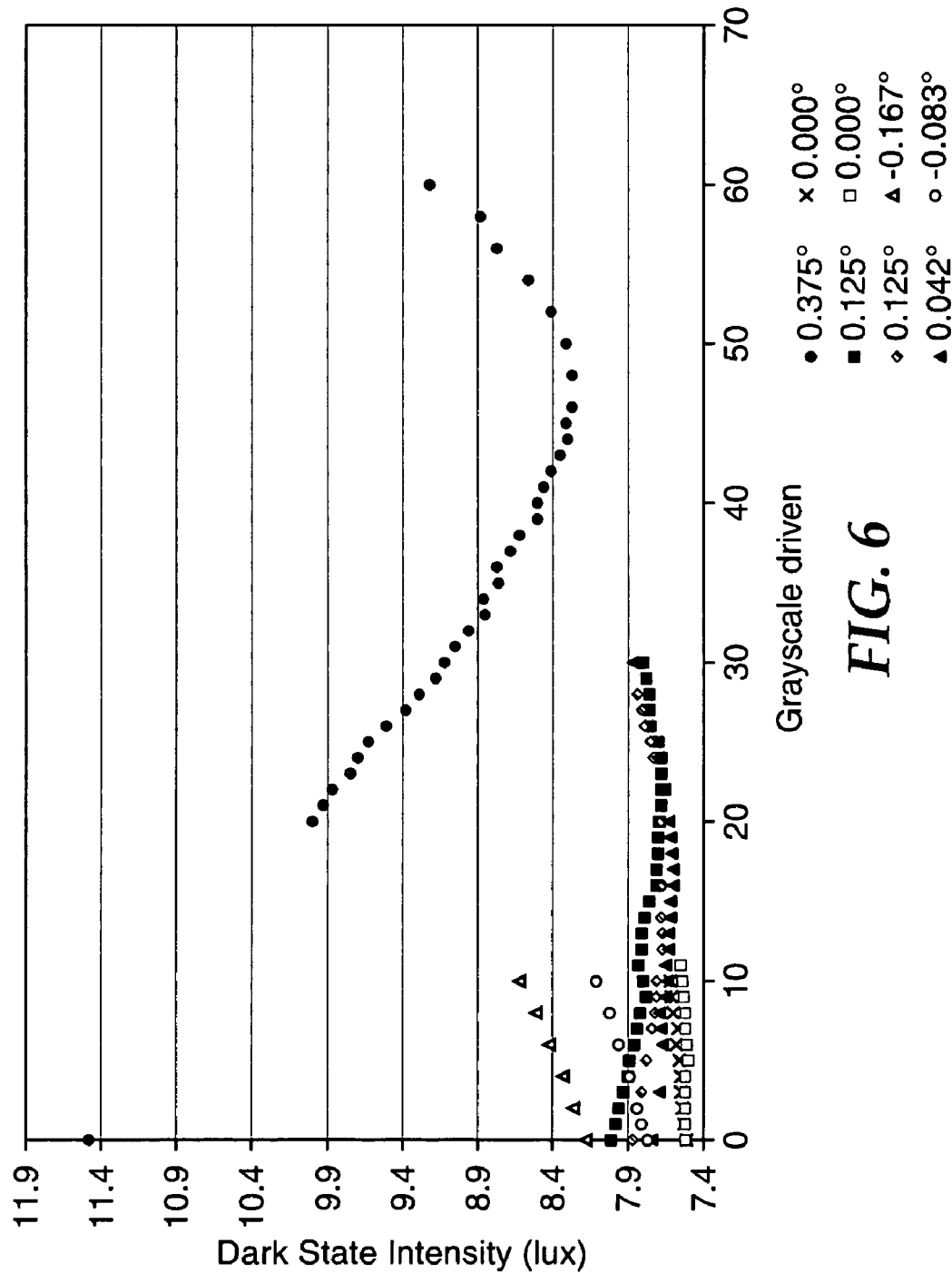
FIG. 6 shows a graph of dark state brightness as a function of applied bias, for various orientation angles of the retarding element.

A graph shown the brightness of the dark state is shown in FIG. 6 for various orientations of the retarder, as a function of the bias voltage applied to the image-forming device. The bias voltage is presented in terms of the greyscale. It can be seen that rotation of the retarder in the negative direction results in a brighter GS=0 dark state, and that in this case the application of the bias voltage only increases the brightness.

All angles described above are relative to the best angle for orientation of the retarder, i.e. that orientation that produces the least bright dark state when the image-forming device is unbiased. For the particular image-forming device used here, this orientation corresponds to the fast or slow axis of the retarder being set at an angle to 0.247°±0.017° (one standard deviation) relative to the polarization axis of the incident light. Thus, the retarder may be oriented so that the fast or slow axis of the retarder is set at about 0.25°+0.375°=0.625°, although other angles may be selected, depending on the manufacturing tolerances of the components used.

For other VAN mode image-forming devices, for example having an unbiased residual birefringence of around 5 nm, the fast or slow axis of the retarder is set to about 1.75° for relative to the polarization plane for θ=0°, i.e. $\theta_c$=1.75°. Thus, the slow or fast axis of a retarder used with these image-forming devices may be set at an angle of about 1.75°+0.375°=2.125°, although other angles may be selected.

In different embodiments, the fast or slow axis of the retarder may be set at an angle whose value differs from the value of $\theta_c$ by less than 1°, less than 0.5° or less than 0.25°.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projection system, comprising:
   a first image-forming device;
   a first polarizing beamsplitter, illumination light passing via the first polarizing beamsplitter to the first image-forming device;
   a first retardation element disposed between the first image-forming device and the first polarizing beamsplitter;

a bias controller attached to the first image-forming device and applying a bias to pixels in the dark state so as to substantially maximize contrast in image light that has passed through the first polarizing beamsplitter from the first image-forming device.

2. A system as recited in claim 1, further comprising a projection lens unit to project image light received from the first image-forming device.

3. A system as recited in claim 2, further comprising a color combiner and at least a second image-forming device, image light from the first image-forming device and from the at least a second image-forming device being combined in the color combiner to produce a combined image beam, the combined image beam being projected by the projection lens unit.

4. A system as recited in claim 1, further comprising a light source capable of generating the illumination light.

5. A system as recited in claim 1, further comprising a controller coupled to control an image formed by the image-forming device.

6. A system as recited in claim 1, wherein the first retardation element is attached to one of the first image-forming device and the first polarizing beamsplitter.

7. A system as recited in claim 6, further comprising a dust-excluding seal connecting between the first image-forming device and the first polarizing beamsplitter, the first retardation element being disposed within the sealed volume defined by the first image-forming device, the first polarizing beamsplitter and the dust excluding seal.

8. A system as recited in claim 1, wherein the first retardation element has a fast axis and a slow axis, and one of the fast axis and slow axis of the retardation element is oriented at an angle, $\theta$, and the difference between $\theta_c$ and $\theta$ is less than 1°, where $\theta_c$ is the angle at which the one of the fast or slow axis of the retardation element would be oriented to achieve maximum contrast when no bias is applied to pixels of the first image-forming device.

9. A system as recited in claim 8, wherein the difference between $\theta$ and $\theta_c$ is less than 0.5°.

10. A system as recited in claim 9, wherein the difference between $\theta$ and $\theta_c$ is less than 0.25°.

11. A method of operating a projection system, comprising:
illuminating an image-forming device with illumination light that has passed through a polarizing beamsplitter and through a retarding element disposed between the image-forming device and the polarizing beamsplitter;
reflecting at least some of the illumination light as image light;
substantially separating the image light from non-image light using the polarizing beamsplitter; and
applying a compensating bias signal to pixels of the image-forming device so as to substantially minimize dark state brightness of the image light.

12. A method as recited in claim 11, further comprising controlling the image forming device to change the image contained in the image light.

* * * * *

UNITED STATES PATENT AND TRADEMARK OFFICE
CERTIFICATE OF CORRECTION

PATENT NO. : 7,542,194 B2  Page 1 of 1
APPLICATION NO. : 11/297544
DATED : June 2, 2009
INVENTOR(S) : Charles L. Bruzzone It is certified that error appears in the above-identified patent and that said Letters Patent is hereby corrected as shown below:

Column 2
Line 16, delete "beamsplifter" and insert -- beamsplitter --, therefor.

Column 3
Lines 47 - 48, delete "image-orming" and insert -- image-forming --, therefor.

Signed and Sealed this

Twenty-second Day of September, 2009

David J. Kappos
*Director of the United States Patent and Trademark Office*